United States Patent [19]

Fichter, Jr. et al.

[11] E Re. 29,748

[45] Reissued Aug. 29, 1978

[54] DRY WORKING BLACK IMAGE COMPOSITIONS COMPRISING ORGANIC HALOGEN COMPOUNDS AND ETHYLENE COMPOUNDS

[75] Inventors: Harry L. Fichter, Jr., Hudson; James M. Lewis, Aurora, both of Ohio

[73] Assignee: Horizons Incorporated a division of Horizons Research Incorporated, Cleveland, Ohio

[21] Appl. No.: 747,978

[22] Filed: Dec. 6, 1976

Related U.S. Patent Documents

Reissue of:

[64] Patent No.: 3,510,304
Issued: May 5, 1970
Appl. No.: 603,731
Filed: Dec. 22, 1966

[51] Int. Cl.[2] ..... G03C 5/04; G03C 1/52; G03C 5/24

[52] U.S. Cl. ..... 96/27 E; 96/48 R; 96/48 QP; 96/90 R

[58] Field of Search ..... 96/27 E, 48 QP, 48 R, 96/90 R

[56] References Cited

U.S. PATENT DOCUMENTS 3,436,353 4/1961 Dreyer et al. ..... 96/90 R

*Primary Examiner*—Won H. Louie, Jr.
*Attorney, Agent, or Firm*—Lawrence I. Field

[57] ABSTRACT

This application describes a photosensitive composition which prints out directly as a black or near neutral image when exposed photographically and which has a greatly improved speed.

11 Claims, No Drawings

DRY WORKING BLACK IMAGE COMPOSITIONS COMPRISING ORGANIC HALOGEN COMPOUNDS AND ETHYLENE COMPOUNDS

Matter enclosed in heavy brackets [ ] appears in the original patent but forms no part of this reissue specification; matter printed in italics indicates the additions made by reissue.

*This is an application to reissue U.S. Pat. 3,510,304 issued May 5, 1970.*

This invention relates to photosensitive compositions from which a black or near neutral image is obtained as a direct printout or as the result of the application of heat to said composition after it has been photographically exposed. More particularly, it relates to photosensitive compositions having improved photographic speed as compared with prior art compositions and which have totally dry working characteristics.

The invention also relates to photosensitive compositions from which a black or near neutral positive image is obtained as a direct printout by first exposing the composition to a sensitizing dose of radiation and then photographically exposing the composition to a pattern of inferred radiation having wavelengths longer than 6500 Angstrom units.

Photosensitive compositions which are believed to be based on free radicals are described in a large number of patents and patent applications and in technical articles published by Horizons Incorporated and a list of issued United States Patents is appended below for the purpose of incorporating their disclosures herein, by reference.

Some of the listed patents and publications describe free radical photographic systems which are dry fixing, i.e. in which the image obtained after exposure is fixed and rendered insensitive to light by totally dry means. Others of the listed patents and publications describe free radical photographic systems which yield a black image or near neutral image.

A specific object of this invention is to provide a dry working photographic composition yielding a black or near neutral image as a direct printout or as the result of the application of heat to said composition after it has been photographically exposed and particularly to compositions having a greatly improved photographic speed as compared with prior art compositions having totally dry working characteristics.

With the exception of color photographic printing or where a specific colored image is desired for display purposes, virtually every practical application of the above noted free radical photographic systems prefer a black or near black image color. Such contemplated uses include: office photocopy; microfilm retrival systems; photographic printing, e.g. portraiture proofing; and even such military uses as the multigeneration aerial reconnaissance printing described in PS&E, vol. IX, No. 2, pp. 133–137, 1965; and all such users demand a suitable black image produced without recourse to wet processing.

| UNITED STATES PATENTS | |
|---|---|
| 3,042,515 | 3,109,736 |
| 3,042,516 | 3,112,200 |
| 3,042,517 | 3,113,024 |
| 3,042,518 | 3,114,635 |

-continued

| UNITED STATES PATENTS | |
|---|---|
| 3,042,519 | 3,121,632 |
| 3,046,125 | 3,121,633 |
| 3,046,209 | 3,140,948 |
| 3,056,673 | 3,140,949 |
| 3,082,086 | 3,147,117 |
| 3,095,303 | 3,155,509 |
| 3,100,703 | 3,154,416 |
| 3,102,027 | 3,164,467 |
| 3,102,029 | 3,202,507 |
| 3,102,810 | 3,272,635 |
| 3,104,973 | 3,275,443 |
| 3,106,466 | 3,285,744 |

PUBLICATIONS

Photographic Science and Engineering, vol. 5, No. 2, Mar.–Apr. 1961, pp. 98–103.

Photographic Science and Engineering, vol. 8, No. 2, Mar.–Apr. 1964, pp. 91–95.

Photographic Science and Engineering, vol. 8, No. 2, Mar.–Apr. 1964, pp. 95–103.

Photographic Science and Engineering, vol. 9, No. 2, Mar.–Apr. 1965, pp. 133–137.

The neutral image, dry working characteristics of the compositions herein described are particularly important in certain of the above uses, since the use of a wet working system in high speed aircraft or space vehicles is almost inconceivable. One such use whose feasibility has been established is the preparation of multigeneration printing of aerial reconnaissance negatives as described in the above noted publication. When a military reconnaissance aircraft photographs a target, the negative resulting from that photograph is developed and reproduced through as many as four generations for determination of the intelligence revealed in the photograph. The original negative is printed only once and then is stored in the archives. All subsequent prints are made from the second generation prepared from the original negative. Conventional silver halide systems are not completely suitable for this multigeneration printing purpose, since the image is granular (particulate) and consequently each subsequent generation loses information which may be valuable in strategic decisions made from the use of these photographs. Free radical photo-system being molecular rather than granular have almost unlimited resolution particularly when coated in thin layers, (about 4 to 5 microns thick), to take advantage of the geometry off present printer processors and their light sources. Free radical photographic systems have been established to be an excellent medium for these multigeneration aerial reconnaissance printings, especially photosensitive free radical compositions based on the teachings of U.S. Pat. 3,109,736 and described in Photographic Science and Engineering, vol. IX, No. 2, pp. 133–137, for Mar. and Apr., 1965, under the title of "New Photographic Processes, No. 4, The Cyanine Base Free Radical Photosystem–A Panchromatic Black Image High Resolution Printout Film." The composition described yield excellent jet black images and retain high latitude multigeneration printing through four generations, with the minimum loss of intelligence. However, the compositions are not dry working, but require a solvent rinse after exposure to render the image fixed and stable to ambient light.

Photointerpreters who evaluate these aerial reconnaissance photographs traditionally have been schooled in the use of black image materials and are reluctant to use other colors. Hence the need for a dry working black image system to be used for aerial reconnaissance multigeneration printing.

One preferred composition from which hand coatings were made at .0015 inch wet thickness on raw polyester film and thereafter evaluated as indicated below consisted of the following:

1,1-bis(dimethylaminophenyl)ethylene*—50 mg.
Iodoform—200 mg.
4-Picoline-1-oxide-5-mg.
2,6-di-t-butyl-p-cresol-25 mg.
Triphenylstibine-10 mg.
Polystyrene 10% in benzene-3 cc.
Acetone-1 cc.
Benzene-1 cc.

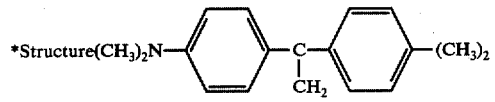

The composition is prepared by bringing the several constituents together in a suitable solvent system under a safelight or in total darkness and, after thoroughly mixing the composition, applying it to a solid substrate such as baryta paper or a film of polyester, glass or other suitable support.

After the composition has been laid down as a thin film, it is permitted to dry in air, in the dark or under a safelight, and then it is photographically exposed to the equivalent of 0.01 watt seconds/cm$^2$ and heat fixed for 5–10 minutes at 135° C. in moving air, whereby a very stable dense near black image was observed in the exposed area. With this amount of exposure, maximum density of about 1.0 is achieved and the heated film is completely fixed, i.e. the image and background do not change upon further exposure to light. Increasing the exposure to the equivalent of 0.1 watt second/cm$^2$ gave maximum densities in excess of 2.0 in the 14th step of a 21 step tablet. While not wishing to be bound by any specific explanation as to the function of each of the several constituents, it is believed that it is the dimethylaminophenyl substituted ethylene which constributes to the formation of a black or near neutral image when acted on by the products which result when the iodoform is exposed to a suitable dose of radiant energy. Instead of the

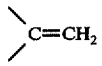

group in this compound, an

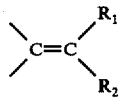

group in which $R_1$ and $R_2$ are each alkyl or aryl or in which one of $R_1$ and $R_2$ is H, could be present.

The function of the 4-picoline-N-oxide in the composition appears to be that of an organic oxidizing agent which acts as a speed promoter in compositions containing a leuco compound.

The triphenylstibine and 2,6-d-t-butyl-p-cresol appear to act as stabilizers and prevent oxidation or degradation of the color formers during the exposure and the subsequent heating of the composition when in the form of a photosensitive film. The use of these compounds is described in other issued patents and/or co-pending patent applications filed on behalf of the applicants' assignee.

Binders for these compositions can be chosen from any one of a number of binders described in the patents already issued on free radical photographic compositions. Polystyrene, polyvinyl chloride, styrene-acrylonitrile copolymers, ethyl cellulose both G type and N type, cellulose acetate butyrate, polyvinyltoluene, butadiene-styrene copolymers, the copolymer of polyvinyl chloride and vinylisobutyl ether, have all been used successfully in the practice of this invention. The choice of binder, however, produces considerable variation in photographic speed and image color. All of the foregoing binders gave a neutral to black image.

Various substitutions may be made in the above formulation without departing from the intended scope of the invention.

For instance, other ethylene compounds may be used in place of the dimethylaminophenyl ethylene compound of the specific example including other substantially colorless ethylene compounds represented by the general formula

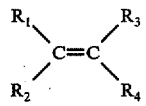

wherein $R_1$ and $R_2$ each represent a p-dialkylaminophenyl group in which the alkyl groups are selected from the group consisting of methyl and ethyl, and each of $R_3$ and $R_4$ represent a monovalent material selected from the group consisting of H, halogen, alkyl, aryl, and other monovalent groups which do not interfere with the resonance of the ethylenic double bond connecting the two carbon atoms.

For instance, instead of polystyrene in benzene, other film forming binders can be used. Particularly preferred are polystyrene with molecular weight above 100,000 (e.g. about 223,000) and a butadiene-styrene copolymer sold as Pliolite-S-5A (Goodyear Chemical Co.).

Further, instead of triphenylstibine, other triaryl Group V compounds may be used, such as triphenylarsine, phosphine or bismuthine, as described in U.S. Pat. 3,275,443 issued Sept. 27, 1966, to Eugent Wainer.

Similarly, it is possible to use other organic halogen compounds as described in U.S. pat. 3,042,515 issued July 3, 1962, to Eugene Wainer, instead of the preferred iodoform.

Instead of iodoform, the free radical source may be any compound represented by the general formula $A—C—X_3$ wherein each X represents an iodine, bromine or chlorine atom and not all of the X's need be the same, and A represents a monovalent substance taken from the group consisting of H, Cl, Br, I, alkyl, aryl, aroyl, and the like.

Finally, it should be noted that although the proportions given in the preceding example are believed to give optimum results for the specified constituents, the percentage of the individual constituents can be varied over a considerable range, depending in some instances on the solubility of the specific ingredient and in others on the nature and amount of the other compounds present in the formulation and on the results desired.

With the formulation given above, proportions which have been found suitable are as follows: (parts by weight)

| | Mg |
|---|---|
| 1,1-bis-p-dimethylaminophenyl ethylene | 1–100 |
| 4-picoline-N-oxide | 0.1–10 |
| Triphenylstibene | 0.1–20 |
| 2,6-di-t-butyl-p-cresol | 0.1–50 |
| Iodoform | 100–1000 |

With the formulations within the above percentages, a rangé of exposure of from 0.001 to 1.0 watt second/per square centimeter have been found to be quite adequate. Exposures of more than 1.0 watt second/per square centimeter appear to amount to over exposure and to give some fog build-up.

With other ingredients substituted in the above, or with other relative proportions, the range of exposure may be readily determined from a sensitivity curve made with calibrated monochromatic exposures in a manner known in the art.

Hand coatings 0.0015 inch wet thickness were made of the above defined preferred composition on raw polyester film and after the coatings had been given a blanket exposure for 1 to 3 seconds to light from a 250 watt reflector lamp, the distance from the lamp to the plane of the film being 15 inches, the sensitized film was exposed photographically to the equivalent of 5 to 10 watt seconds/sq. cm. of radiation having wave lengths longer than 6500 angstrom units, whereby an image printed out directly, which was intensified and rendered stable by heat fixing at 135° C.–150° C. for about 5 minutes in moving air.

Having now described a preferred embodiment of this invention, it is not intended that it be limited except as many be required by the appended claims.

We claim:

1. A photosensitive composition comprising:

(a) an organic halogen compound having at least three halogen atoms attached to a terminal carbon atom; and (b) a substantially colorless ethylene compound represented by the formula

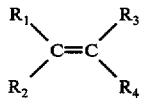

wherein $R_1$ and $R_2$ each represent a p-dialkylaminophenyl group in which the alkyl groups are selected from the group consisting of methyl and ethyl, and each of $R_3$ and $R_4$ represents a monovalent material selected from the group consisting of H, halogen, alkyl, aryl, and other monovalent groups which do not interfere with the resonance of the ethylenic double bond connecting the two carbon atoms;

said constituents being present in proportions which yield a near neutral or black image when reacted with the products resulting from the photolytic exposure of said organic halogen compound; and (c) a support for said composition.

2. The composition of claim 1 including at least one additional compound which enhances the formation of the direct printout image and which is selected from the group consisting of picoline-1-oxide, triaryl compounds of an element selected from the group consisting of Sb, As, Bi and P, and di-t-butyl-p-cresol.

3. The composition of claim 1 in which (b) is 1,1-bis-(p-dimethylaminophenyl) ethylene.

4. The composition of claim 1 wherein the constituents are

| | Mg |
|---|---|
| 1,1-bis-p-dimethylaminophenyl ethylene | 1–100 |
| 4-picoline-N-oxide | 0.1–10 |
| Triphenylstibene | 0.1–20 |
| 2,6-di-t-butyl-p-cresol | 0.1–50 |
| Iodoform | 100–1000 |

5. The composition of claim 1 wherein the constituents are 1,1-bis-(p-dimethylaminophenyl) ethylene-50 mg.
Iodoform-200 mg.
4-Picoline-1-oxide-5 mg.
2,6-di-t-butyl-p-cresol-25 mg.
Triphenylstibine-10 mg.
Polystyrene 10% in benzene-3 cc.
Acetone-1 cc.
Benzene-1 cc.

6. A dry working photographic process which comprises preparing composition of claim 1 in a thin film; exposing said composition to a pattern of radiant energy, whereby a neutral or nearly black image prints out directly as a result of said exposure; and fixing said image in said composition by heating the same.

7. The photographic process of claim 4 wherein the thin film is given a blanket exposure to suitable radiation in the visible prior to exposing it to a pattern of radiant energy and the radiant energy to which it is then exposed has a wavelength greater than 6500 angstrom units.

*8. A dry working photographic process according to claim 6 wherein said exposure comprises an exposure to the equivalent of 0.001 to 1.0 watt seconds/per square centimeter through a negative or positive original whereby an image prints out directly as the result of said exposure.*

*9. A dry working photographic process according to claim 6 wherein said exposure comprises an exposure of the photosensitive composition to the equivalent of 0.01 watt seconds/per square centimeter to 0.1 watt seconds/per square centimeter.*

*10. A dry working photographic process according to claim 6 wherein said heating of the photosensitive composition containing the image is for 5 to 10 minutes at 135° C to 150° C in moving air to fix the image.*

*11. A dry working photographic process according to claim 6 wherein said thin film comprising the photosensitive composition is coated on a substrate.*

* * * * *